(12) United States Patent
Sakurai et al.

(10) Patent No.: US 7,141,294 B2
(45) Date of Patent: Nov. 28, 2006

(54) DECORATIVE ADHESIVE FILMS

(75) Inventors: Aizo Sakurai, Tokyo (JP); Hajime Chisaka, Yamagata (JP); Yutaka Mori, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 288 days.

(21) Appl. No.: 10/472,880

(22) PCT Filed: Mar. 21, 2002

(86) PCT No.: PCT/US02/08505

§ 371 (c)(1),
(2), (4) Date: Sep. 18, 2003

(87) PCT Pub. No.: WO02/077115

PCT Pub. Date: Oct. 3, 2002

(65) Prior Publication Data

US 2004/0096630 A1    May 20, 2004

(30) Foreign Application Priority Data

Mar. 21, 2001  (JP) .............................. 2001-081097

(51) Int. Cl.
 *B32B 17/12*   (2006.01)
 *B44C 1/10*    (2006.01)

(52) U.S. Cl. ..................... 428/195.1; 428/39; 428/355; 428/500

(58) Field of Classification Search ............. 428/195.1, 428/500, 39, 355
See application file for complete search history.

(56) References Cited

U.S. PATENT DOCUMENTS

| | | | |
|---|---|---|---|
| 4,812,355 A * | 3/1989 | Yokoyama et al. | 428/215 |
| 5,196,246 A | 3/1993 | Kauss et al. | 428/39 |
| 5,198,301 A | 3/1993 | Hager et al. | 428/355 |
| 6,200,666 B1 * | 3/2001 | Christian et al. | 428/195.1 |

OTHER PUBLICATIONS

Encyclopedia of Polymer Science and Engineering; vol. 8, p. 396.

* cited by examiner

*Primary Examiner*—Rena Dye
*Assistant Examiner*—Camie S. Thompson
(74) *Attorney, Agent, or Firm*—Harold C. Knecht, III; Jean A. Lown

(57) ABSTRACT

A decorative film using no appreciable amount, or no amount, of polyvinyl chloride. In a decorative film comprising a substrate and an adhesive layer formed on one surface of the substrate, the substrate is formed from an ethylene-(meth)acrylic acid copolymer.

20 Claims, 1 Drawing Sheet

DECORATIVE ADHESIVE FILMS

FIELD OF THE INVENTION

The present invention relates a decorative film and, more particularly, to a decorative film which is superior in sticking operability to an adherend and is also superior in ink adhesion.

BACKGROUND OF THE INVENTION

To decorate the surface of various products, a decorative film for sticking to the surface thereof has hitherto been used. This decorative film comprises a substrate; an adhesive layer for sticking a decorative film to an adherend, formed on one surface of the substrate; a printed layer provided with a printed decorative pattern or character information, formed on the other surface of the substrate; and a top clear layer for protecting the printed layer.

This decorative film requires the stretchability for satisfying the conformability to the shape of the adherend surface and the surface property which prevents wrinkles from occurring after sticking, and also requires the weatherability and water resistance when used in vehicles and buildings. Furthermore, a substrate of this decorative film requires the printability for forming a printed layer. Therefore, soft polyvinyl chloride, which satisfies these requirements, has hitherto been used as the substrate of this decorative film.

However, the use of polyvinyl chloride has a problem that a plasticizer oozes out and a problem that a harmful chlorine-based gas is evolved on incineration and polyvinyl chloride is a chlorine salt of so-called dioxin. Therefore, the use of polyvinyl chloride tends to be globally restricted from an environmental point of view and materials, which satisfy the above requirements and can be replaced by vinyl chloride, are required as the substrate of the decorative film. It has been studied to use various soft polyolefins (for example, polypropylene and polyethylene) in place of polyvinyl chloride, however, these soft polyolefins have problems such as poor flexibility suited for a sticking operation to an adherend, and poor printability because of low surface energy. Therefore, these soft polyolefins are not necessarily suited for use in the decorative film.

SUMMARY OF THE INVENTION

An object of the present invention is to provide a decorative film, which is superior in one or more properties such as, for example, surface conformability to an adherend, printability, and water resistance, without using polyvinyl chloride.

To solve the problems described above, according to the present invention, in a decorative film comprising a substrate and an adhesive layer formed on one surface of the substrate, the substrate is formed from an ethylene-(meth) acrylic acid copolymer.

It is desirable for the decorative film of the present invention to further comprise a printed layer formed on the surface opposite to the surface on which the adhesive layer of the substrate is formed.

The substrate can be formed by bringing an ethylene-(meth)acrylic acid copolymer having an unsaturated (meth) acrylic acid content of 8 to 30% by weight into contact with a base to form an aqueous dispersion of ethylene-(meth) acrylic acid, coating the dispersion on the substrate and drying the coating film.

It is preferred that the substrate has such properties that a film thickness is 10 μm or more, an elongation at break is 15% or more, and a maximum value of a change in tensile strength per 1% elongation is within a range of from 0.2 to 10.0 MPa when stretched by 10%, while a stress ratio of a stress after 20 seconds to an initial stress is 0.55 or less and a stress ratio of a stress after 120 seconds to an initial stress is 0.45 or less with respect to stress relaxation after 5% stretching.

BRIEF DESCRIPTION OF THE INVENTION

DETAILED DESCRIPTION

Figure 1:
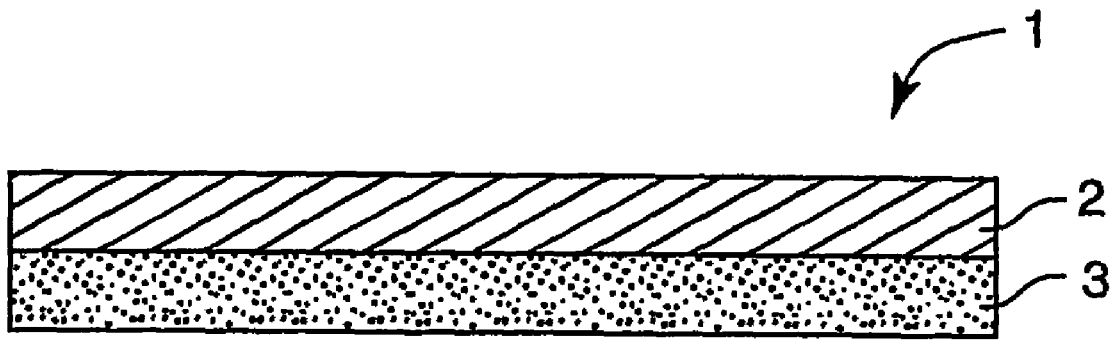
FIG. 1 is a sectional view schematically showing one embodiment of a decorative film of the present invention.

Referring to FIG. 1, a decorative film 1 comprises a substrate 2 and an adhesive layer 3 formed on one surface of the substrate. A top clear layer (not shown) may be formed on the surface opposite to the surface on which the adhesive layer of the substrate is formed.

Figure 2:
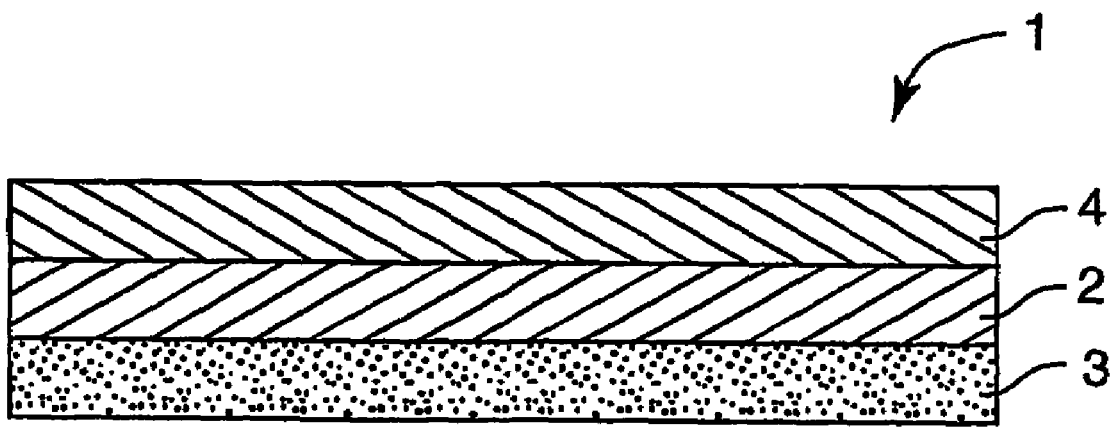
FIG. 2 is a sectional view schematically showing another embodiment of a decorative film of the present invention.

Referring to FIG. 2, another decorative film 1 comprises a substrate 2, an adhesive layer 3 formed on one surface of the substrate 2, and a printed layer 4 formed on the surface opposite to the surface on which the adhesive layer 3 is formed. A top clear layer (not shown) may be formed on the printed layer 4.

The respective constituent elements of the decorative film of the present invention will now be described.

The substrate in the decorative film of the present invention is composed of an ethylene-(meth)acrylic acid copolymer. The ethylene-(meth)acrylic acid copolymer does not contain an appreciable amount of chlorine and has not a problem which arises when using a conventional polyvinyl chloride. Preferably, the ethylene-(meth)acrylic acid copolymer does not contain any chlorine.

The ethylene-(meth)acrylic acid copolymer can be obtained by copolymerizing ethylene with acrylic acid or methacrylic acid using a conventional technique. The ethylene-(meth)acrylic acid copolymer is one that is useful as an adhesive and preferably a thermoplastic polymer. The copolymer can be used as a film formed on a substrate, such as paper or metal foil, for example, by melt extrusion. However, the surface of the film formed by the melt extrusion can become uneven and the film insufficient in surface property to be used as a decorative film. When the (meth) acrylic acid content in the ethylene-(meth)acrylic acid used in the melt extrusion is too high, it can become difficult to conduct melt extrusion and, therefore, the (meth)acrylic acid content must be reduced. On the other hand, when the (meth)acrylic acid content is too low, the printability of the resulting film is lowered.

In the present invention, a substrate can be preferably formed by converting the ethylene-(meth)acrylic acid copolymer into an aqueous dispersion and coating the dispersion. That is, a film of the ethylene-(meth)acrylic acid copolymer is formed by dispersing an ethylene-(meth) acrylic acid copolymer in water to form a dispersion, coating a substrate made of polyethylene terephthalate with the dispersion, and drying the coating film.

The ethylene-(meth)acrylic acid copolymer is preferably a random copolymer having a molecular weight within a preferred range so as to have a melt flow rate of from 1 g/10 min. to 5000 g/10 min., and more preferably from 15 g/10 min. to 65 g/10 min., (ASTM D1238, under the conditions of 125° C./2.16 kg). The melt flow rate of the ethylene-methacrylic acid copolymer (EMAA) is preferably within a range of from 1 g/10 min. to 5000 g/10 min., and more preferably from 60 g/10 min. to 500 g/10 min., (ASTM D1238, under the conditions of 125° C./2.16 kg).

To enhance the dispersibility of the ethylene-(meth) acrylic acid copolymer, the (meth)acrylic acid content in the ethylene-(meth)acrylic acid copolymer is preferably increased in the case of forming a water dispersion. When the content is too high, the resulting film is insufficient in properties for the substrate and, therefore, the (meth)acrylic acid content is preferably controlled within a range of from 8 to 30% by weight.

To enhance the dispersibility of the ethylene-(meth) acrylic acid copolymer in water, the ethylene-(meth)acrylic acid copolymer is preferably dispersed in water while neutralizing carboxyl groups with a base. As the base, ammonium hydroxide or an alkali metal hydroxide, for example, lithium hydroxide, sodium hydroxide or potassium hydroxide is preferably used.

In case a film is formed by using an aqueous dispersion of a salt of an ethylene-(meth)acrylic acid copolymer neutralized with ammonium hydroxide, ammonium groups are dissociated after film formation, and then returned to carboxyl groups. On the other hand, the alkali metal remains as the carboxylate even after film formation. Carboxyl groups contribute to the adhesion of ink to the film, while the carboxylate contributes to the strength of the film. Therefore, desired properties can be imparted to the resulting substrate by controlling the ratio between the both. Specifically, the molar ratio of the amount of the alkali metal carboxylate to the total amount of the carboxylic acid derivative (having carboxyl groups) can be controlled to make a balance between the strength, ink adhesion and water resistance of the decorative film optimum by neutralizing the ethylene-(meth)acrylic acid copolymer with a predetermined amount of a mixture of ammonium hydroxide and an alkali metal hydroxide to form a dispersion, or by mixing a dispersion, which is formed by neutralizing the ethylene-(meth)acrylic acid copolymer with ammonium hydroxide, with a dispersion formed by neutralizing the ethylene-(meth) acrylic acid copolymer with an alkali metal hydroxide. This molar ratio is preferably within a range of from 0.01 to 0.33, and more preferably from 0.07 to 0.28.

When the molar ratio is less than 0.01, the effect of the alkali metal carboxylate to enhance the strength of the film is scarcely achieved. The molar ratio is controlled to 0.33 or more for the following reason. It is generally known that oxygen molecules are eight-coordinated to the alkali metal ion such as $Na^+$ to form an octahedral ionic crystal. It is generally known that, in the case of a carboxyl group, a trifunctional group moiety is coordinated to a $Na^+$ ion. It is considered that a regular structure wherein three carboxyl groups or carboxylates are coordinated per $Na^+$ ion is formed in a Na ionomer of an ethylene-(meth)acrylic acid copolymer. When the molar ratio of the amount of the alkali metal carboxylate to the total amount of the ethylene-(meth) acrylic acid copolymer in the substrate is 0.33 or less, a change in tensile strength of the substrate increases with the increase of the $Na^+$ ion. However, when the molar ratio is more than 0.33, the change in tensile strength is saturated and not increases. It is considered that excess $Na^+$ not only impairs stress relaxation properties of the substrate (impairs the sticking operability), but also exerts an adverse influence on the water resistance. Therefore, the molar ratio is preferably 0.33 or less.

Before forming a film from the water dispersion of the ethylene-(meth)acrylic acid copolymer, a non-dispersible substance is preferably removed by filtration of the dispersion. Thus, it is made possible to eliminate gel or fish eye, which is likely to occur during the film formation, and to impart smooth surface property to the resulting film.

If necessary, various additives (for example, ultraviolet absorbers, photostabilizers, defoamers, and thermal stabilizers) may be added to the water dispersion of the ethylene-(meth)acrylic acid copolymer, and a colored substrate can be easily obtained by adding pigments.

The thickness of the substrate thus obtained is preferably 10 μm or more. When the thickness is 10 μm or less, sufficient strength for the substrate can not be obtained. Therefore, a desired thickness is obtained by coating with the water dispersion of the ethylene-(meth)acrylic acid copolymer. The substrate thus obtained has the flexibility suited for the sticking operability required to the substrate of the decorative film. The flexibility suited for the sticking operability means that the substrate has a certain degree of the softness and elongation in the case of sticking the decorative film on the curved surface, and retains the tensile strength required to maintain the stretched state on sticking with good balance. Specifically, these properties are properties wherein an elongation at break is 15% or more and a maximum value of a change in tensile strength per 1% elongation is within a range of from 0.2 to 10.0 MPa when stretched by 10%, while a stress ratio of a stress after 20 seconds to an initial stress is 0.55 or less and a stress ratio of a stress after 120 seconds to an initial stress is 0.45 or less with respect to stress relaxation after 5% stretching.

On one surface of the substrate thus formed, an adhesive layer is formed to bond the decorative film with an adherend. This adhesive layer may be formed from any adhesive as far as the resulting adhesive layer has good adhesion with the substrate and can improve the adhesion of the decorative film to the adherend. As a proper adhesive, for example, an acrylic-based adhesive can be used. The thickness of the adhesive layer is not specifically limited, but is preferably within a range of from 5 to 50 μm. When the thickness of the adhesive layer is less than 5 μm, sufficient adhesive strength can not be obtained. On the other hand, when the thickness of the adhesive layer exceeds 50 μm, it becomes difficult to coat. A primer layer may be formed between the substrate and the adhesive layer to further improve the adhesion between them. Alternatively, the surface of the substrate is subjected to a corona treatment to improve the adhesion between the substrate and the adhesive layer.

On the surface of the adhesive layer, a release paper is preferably formed, as is commonly conducted in the field of an adhesive film. This release paper is, for example, a paper coated with a releasant such as silicone resin, or a substrate sheet or film made of polyethylene terephthalate.

On the surface opposite to the surface, on which the adhesive layer is formed, of the substrate, a printed layer can be formed. This printing layer can be constituted similar to the printed layer used generally used in the field of the decorative film and can be formed, for example, by laminating a colored resin composition prepared by adding a pigment to a resin. The thickness of the printed layer is not specifically limited, but is usually within a range of from 1 to 50 μm. When the thickness of the printed layer is less than 1 μm, blur of printing is likely to occur and the reproducibility of the color tone is poor because of a reduction in hiding power. On the other hand, when the thickness exceeds 50 μm, it becomes difficult to form the printed layer itself.

On the surface opposite to the surface, on which the adhesive is formed, or on the printed layer of the substrate, a top clear layer is preferably formed to protect the surface of these surfaces. The top clear layer used as an outer-most layer is preferably made of a material which is superior in weatherability and water resistance and has high transparency. Examples of the material include colorless coating compositions such as fluororesin coating composition, thermosetting urethane coating composition, and ultraviolet-curing coating composition. The thickness of the top clear layer is not specifically limited, but is usually within a range of from 1 to 50 μm. When the thickness is less than 1 μm, a predetermined effect of the top clear layer can not be obtained. On the other hand, when the thickness exceeds 50 μm, it is difficult to form a film by coating.

The decorative film thus obtained of the present invention have properties such as flexibility suited for a sticking operation to an adherend, ink adhesion, water resistance, and weatherability with good balance, and is suited to stick on various adherends, and is particularly suited for use as a decorative film for buildings or a decorative film for vehicles used in outdoors. The decorative film is particularly suited to stick to the adherend composed of a curved surface such as body of vehicles because of its flexibility.

EXAMPLES

Preparation of Ethylene-acrylic Acid Copolymer Dispersion

An ethylene-acrylic acid copolymer (EAA) (Primacor 5980I, manufactured by The Dow Chemical, acrylic acid content: 20% by weight) having a melt flow rate of 15 g/10 min. as measured at 125° C. under 2.16 kg based on ASTM D1238, sodium hydroxide (manufactured by Wako Pure Chemical Industries, Ltd.) or ammonia water (aqueous 25 wt % solution, manufactured by Wako Pure Chemical Industries, Ltd.) and water were charged in a reaction vessel equipped with a stirrer according to the formulation shown in Table 1, and then stirred at 95° C. for 5 hours to prepare ethylene-acrylic acid copolymer dispersions 1, 2 and 3. Furthermore, an ethylene-methacrylic acid copolymer (EMAA) (Nucrel N2050H, manufactured by Dupont-Mitsui Polychemicals Co., Ltd., methacrylic acid content: 20% by weight) having a melt flow rate (F) of 500 g/10 min. as measured at 190° C. under 2.16 kg based on JIS K6760, sodium hydroxide (manufactured by Wako Pure Chemical Industries, Ltd.) and water were used according to the formulation shown in Table 1 to prepare an ethylene-methacrylic acid copolymer dispersion 4 in the same manner as described above. MFR was measured according to JIS K-6760.

TABLE 1

Composition of aqueous dispersion

| Aqueous dispersion | Composition | Molar ratio | Solid content (wt %) |
|---|---|---|---|
| Dispersion 1 | Primacor 5980I/NaOH/H$_2$O (28.77:2.24:68.99 wt %) | 0.7 | 29.5 |
| Dispersion 2 | Primacor 5980I/NaOH/H$_2$O (30.02:1.33:71.13 wt %) | 0.4 | 30.3 |
| Dispersion 3 | Primacor 5980I/NH$_3$aq/H$_2$O (29.04:3.84:84.67 wt %) | 0.7 | 29.4 |
| Dispersion 4 | Nucrel N2O5OH/NaOH/H$_2$O (24.14:1.57:74.29 wt %) | 0.7 | 24.8 |

Molar ratio: amount of base/total amount of acrylic acid derivative

Example 1

The dispersions 1 and 3 shown in Table 1 were mixed in a weight ratio of 1:9 and a polyethylene terephthalate (PET) film having a thickness of 50 μm was coated with the resulting mixed dispersion. Then, the coating film was dried in an oven at 100° C. for 20 minutes, thereby to form an EAA film having a thickness of about 40 μm on the PET film. A tensile test at 25° C. and a stress relaxation test of the EAA film were conducted. The results are shown in Table 2 and Table 3. The EAA film was allowed to stand at room temperature for 10 or more days before these tests are conducted.

These tensile test and stress relaxation test were conducted in the following procedures.

Tensile Test

The EAA film thus formed is cut into a dumbbell whose center portion (parallel portion) has a width of 5 mm, which is used as a specimen. After setting the specimen at a chuck distance of 25 mm, the specimen is stretched at 25° C. at a stretch rate of 300 mm/min. Then, the presence or absence of neck-in, the elongation at break, and the maximum value of a change in tensile strength per 1% elongation when the specimen is stretched by 10% are evaluated.

Stress Relaxation Test

The EAA film thus formed is cut into a strip having a width of 25 mm, which is used as a specimen. After setting the specimen at a chuck distance of 100 mm, the specimen is stretched by 5 mm at 25° C. at a stretch rate of 300 mm/min. (initial stress) and stress relaxation in a state of being stretched by 5 mm is measured with a lapse of time. A stress ratio is calculated from the measured value by the formula $(F_o - F_{(t)})/F_o$ where $F_o$ denotes an initial stress (MPa) and $F_{(t)}$ denotes a stress (MPa) after t seconds have passed.

Then, the surface of the EAA film thus formed was coated with an acrylic-based adhesive solution containing butyl acrylate as a main component and drying the coating film, thereby to form an adhesive layer having a thickness of 30 μm. A release paper was laid on the adhesive layer and the PET film was peeled off to obtain a transparent film with an adhesive. Using urethane-based ink containing a pigment added therein, the surface opposite to the surface, on which the adhesive film is formed, of this film was coated by the silk screen printing method and then dried. Furthermore, a urethane-based transparent top clear layer was formed on the printed surface, followed by drying to obtain a decorative film. An ink adhesion test and a water resistance test of the resulting film were conducted. The results are shown in Table 4 and Table 5.

The ink adhesion test and water resistance test were conducted in the following procedures.

Ink Adhesion Test

100 Cross-cuts are formed on the top clear layer of the decorative film by using a cutter. After sticking a tape (#610 manufactured by Sumitomo 3M Co., Ltd.) on the cross-cut decorative film, the tap is peeled off at high speed. The case with no transfer of cross-cuts to the tape was rated good (■), while the other cases were rated poor (x).

Water Resistance Test

Water Resistance Test 1

After sticking the decorative film on a melamine coated steel sheet, the decorative film stuck on the melamine coated steel sheet was allowed to stand at room temperature for 48 hours and dipped in warm water at 40° C. for 240 hours.

After one hour have passed since removal from boiling water, the surface was examined and it was confirmed whether or not defects such as whitening of the substrate and blister of ink or clear occurred at the end portion. The case with no defects was rated good (■), while the other cases were rated poor (X).

Water Resistance Test 2

After sticking the decorative film on a melamine coated steel sheet, the decorative film stuck on the melamine coated steel sheet was allowed to stand at room temperature for 48 hours and dipped in boiling water at 100° C. for 5 minutes. After one hour have passed since removal from boiling water, the surface was examined and it was confirmed whether or not defects such as whitening of the substrate and blister of ink or clear occurred at the end portion. The case with no defects was rated good (■), while the other cases were rated poor (X).

Example 2

In the same manner as in Example 1, except that a mixture of the dispersions 1 and 3 shown in Table 1 in a weight ratio of 2:8 was used as the mixed dispersion, an EAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Example 3

In the same manner as in Example 1, except that a mixture of the dispersions 1 and 3 shown in Table 1 in a weight ratio of 3:7 was used as the mixed dispersion, an EAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Example 4

In the same manner as in Example 1, except that a mixture of the dispersions 2 and 3 shown in Table 1 in a weight ratio of 5.25:4.75 was used as the mixed dispersion, an EAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Example 5

In the same manner as in Example 1, except that a mixture of the dispersions 1 and 3 shown in Table 1 in a weight ratio of 4:6 was used as the mixed dispersion, an EAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Example 6

In the same manner as in Example 1, except that a mixture of the dispersions 1 and 3 shown in Table 1 in a weight ratio of 3:7 was used as the mixed. dispersion, an EAA film having a thickness of 10 μm was formed and then allowed to stand at room temperature for 10 or more days. The tensile test and the stress relaxation test of this film were conducted. In the same manner as in Example 1, a decorative film was formed and the ink adhesion test and the water resistance test were conducted.

Example 7

100 Parts of the mixed dispersion used in Example 1 was mixed with 20 parts of an aqueous titanium dioxide pigment dispersion (AF White E-3D, manufactured by Dainichiseika Color & Chemicals Mfg. Co., Ltd.). Using this dispersion, an EAA film was formed in the same manner as in Example 1 and the tensile test and the stress relaxation test were conducted. In the same manner as in Example 1, a decorative film was formed and the ink adhesion test and the water resistance test were conducted.

Example 8

100 Parts of the mixed dispersion used in Example 1 was mixed with 10 parts of an aqueous titanium dioxide pigment dispersion (AF Black E-2B, manufactured by Dainichiseika Color & Chemicals Mfg. Co., Ltd.). Using this dispersion, a black EAA film was formed in the same manner as in Example 1 and the tensile test and the stress relaxation test were conducted. In the same manner as in Example 1, except that this black EAA film was used and a top clear layer was directly formed on the substrate without using the printed layer, a decorative film was formed and the ink adhesion test and the water resistance test were conducted.

Example 9

In the same manner as in Example 1, except that a mixture of the dispersions 4 and 3 shown in Table 1 in a weight ratio of 3.4:6.6 was used as the mixed dispersion and the coating film was dried in an oven at 160° C., a film comprising an EAA film and an EMAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Comparative Example 1

In the same manner as in Example 1, except that the dispersion 1 shown in Table 1 was used as the dispersion, an EAA film was formed and then allowed to stand at room temperature for 10 or more days. The tensile test and the stress relaxation test of this. film were conducted. In the same manner as in Example 1, a decorative film was formed and the ink adhesion test and the water resistance test were conducted.

Comparative Example 2

In the same manner as in Example 1, except that the dispersion 2 shown in Table 1 was used as the dispersion, an EAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Comparative Example 3

In the same manner as in Example 1, except that the dispersion 4 shown in Table 1 was used as the dispersion and the coating film was dried in an oven at 160° C., an EMAA film was formed and then allowed to stand at room temperature for 10 or more days. The tensile test and the stress relaxation test of this film were conducted. In the same manner as in Example 1, a decorative film was formed and the ink adhesion test and the water resistance test were conducted.

Comparative Example 4

A soft polypropylene film (Pure Softy SR112, manufactured by Idemitsu Petrochemical Co., Ltd.) was subjected to the tensile test and the stress relaxation test. In the same manner as in Example 1, except that this film was used as the substrate, a decorative film was formed and the ink adhesion test and the water resistance test were conducted.

Comparative Example 5

A polyethylene terephthalate film (Lumirror 50-T60, manufactured by Toray Co., Ltd.) was subjected to the tensile test and the stress relaxation test.

Comparative Example 6

A polyvinyl chloride film (SC3650, manufactured by Sumitomo 3M Co., Ltd.) was subjected to the tensile test and the stress relaxation test. In the same manner as in Example 1, except that this film was used as the substrate, a decorative film was formed and the ink adhesion test and the water resistance test were conducted.

TABLE 2

Results of tensile test (25° C.)

|  | Ex. 1 | Ex. 2 | Ex. 3 | Ex. 4 | Ex. 5 | Ex. 6 | Ex. 7 | Ex. 8 | Ex. 9 | Comp. Example 1 |
|---|---|---|---|---|---|---|---|---|---|---|
| Presence or absence of neck-in | none | none | none | none | none | none | none | none | none | None |
| Molar ratio | 0.07 | 0.14 | 0.21 | 0.21 | 0.28 | 0.21 | 0.21 | 0.21 | 0.21 | 0.7 |
| Elongation at break (%) | 348 | 264 | 361 | 277 | 188 | 212 | 268 | 173 | 296 | 268 |
| Film thickness (μm) | 40 | 40 | 43 | 40 | 41 | 10 | 42 | 40 | 40 | 41 |
| Maximum value of change in tensile strength per 1% elongation of film [MPa/%] | 3.00 | 2.84 | 3.24 | 3.29 | 4.36 | 3.10 | 2.59 | 1.73 | 3.34 | 3.10 |
| Evaluation of sticking operability | good | good | good | good | good | good | good | good | good | good |

|  | Comp. Example 2 | Comp. Example 3 | Comp. Example 4 | Comp. Example 5 | Comp. Example 6 |
|---|---|---|---|---|---|
| Presence or absence of neck-in | None | None | observed | none | none |
| Molar ratio | 0.4 | 0.7 | — | — | — |
| Elongation at break (%) | 164 | 208 | 1020 | 148 | 201 |
| Film thickness (μm) | 39 | 37 | 107 | 50 | 50 |
| Maximum value of change in tensile strength per 1% elongation of film [MPa/%] | 4.44 | 2.90 | 4.40 | 23.20 | 5.92 |
| Evaluation of sticking operability | Good | Good | poor | poor | good |

Molar ratio: amount of base/total amount of acrylic acid derivative

The E(M)AA films of Examples 1 to 9 and Comparative Examples 1 to 3 are suited for use as the substrate of the decorative film because of the flexibility suited for use in the sticking operation in tensile properties, similar to the polyvinyl chloride film (Comparative Example 6).

TABLE 3 stress relaxation test

|  | Ex. 1 | Ex. 2 | Ex. 3 | Ex. 4 | Ex. 5 | Ex. 6 | Ex. 7 | Ex. 8 | Ex. 9 | Comp. Example 1 |
|---|---|---|---|---|---|---|---|---|---|---|
| Stress ratio after 20 seconds | 0.35 | 0.39 | 0.49 | 0.55 | 0.54 | 0.47 | 0.50 | 0.32 | 0.37 | 0.70 |
| Stress ratio after 120 seconds | 0.25 | 0.25 | 0.34 | 0.41 | 0.41 | 0.36 | 0.38 | 0.20 | 0.20 | 0.56 |
| Evaluation of sticking operability | good | good | good | good | good | good | good | good | good | poor |

|  | Comp. Example 2 | Comp. Example 3 | Comp. Example 4 | Comp. Example 5 | Comp. Example 6 |
|---|---|---|---|---|---|
| Stress ratio after 20 seconds | 0.72 | 0.71 | 0.61 | 0.71 | 0.32 |

TABLE 3-continued

| | | stress relaxation test | | | |
|---|---|---|---|---|---|
| Stress ratio after 120 seconds | 0.59 | 0.57 | 0.52 | 0.65 | 0.22 |
| Evaluation of sticking operability | Poor | poor | poor | Poor | good |

The E(M)AA films of Examples 1 to 9 are suited for use as the substrate of the decorative film because of the flexibility suited for use in the sticking operation in stress relaxation properties, similar to the polyvinyl chloride film (Comparative Example 6).

TABLE 4

| | Ink adhesion | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| Ink adhesion | ■ | ■ | ■ | ■ | ■ | ■ | ■ | ■ | ■ |
| | Comp. Ex. 1 | Comp. Ex. 2 | Comp. Ex. 3 | Comp. Ex. 4 | Comp. Ex. 5 | Comp. Ex. 6 | | | |
| Ink adhesion | X | X | X | X | X | ■ | | | |

As is apparent from the results of Examples 1 to 9, it is possible to impart the ink adhesion to the substrate by controlling a molar ratio of the alkali metal carboxylate contained in the E(M)AA film.

TABLE 5

| Water resistance test (water resistance test 1: 40° C., 240 hours) | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| Water resistance | □ | □ | □ | □ | □ | □ | □ | □ | □ |
| | Comp. Ex. 1 | Comp. Ex. 2 | Comp. Ex. 3 | Comp. Ex. 4 | Comp. Ex. 5 | Comp. Ex. 6 | | | |
| Water resistance | X | X | X | X | X | □ | | | |

TABLE 6

| Water resistance test (water resistance test 2: 100° C., 5 minutes) | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| Water resistance | □ | □ | □ | □ | □ | □ | □ | □ | □ |
| | Comp. Ex. 1 | Comp. Ex. 2 | Comp. Ex. 3 | Comp. Ex. 4 | Comp. Ex. 5 | Comp. Ex. 6 | | | |
| Water resistance | X | X | X | X | X | □ | | | |

As is apparent from the results of Examples 1 to 9, it is possible to impart the water resistance to the substrate by controlling a molar ratio of the alkali metal carboxylate contained in the E(M)AA film.

As described above, the decorative film of the present invention can be used in place of a decorative film using a conventional polyvinyl chloride as a substrate by using an ethylene-(meth)acrylic acid copolymer as the substrate. This decorative film has excellent adhesion to ink and flexibility suited for a sticking operation to an adherend, and also has properties as a decorative film (e.g. water resistance) with good balance.

The invention claimed is:

1. A decorative film comprising:
    a) a substrate comprising an ethylene-(meth)acrylic acid copolymer comprising 8 to 30 weight percent methacrylic acid that is partially neutralized with ammonium hydroxide or alkali metal hydroxide, said copolymer having a molar ratio of carboxylate groups to carboxyl groups in the range of about 0.01 to about 0.33;
    b) an adhesive layer on a first surface of the substrate; and
    c) a top clear coat on a second surface of the substrate, wherein the second surface is opposite the first surface.

2. The decorative film of claim 1, further comprising a printed layer disposed between the substrate and the top clear coat.

3. The decorative film according to claim 1, wherein the decorative film is attached to a vehicle.

4. The decorative film according to claim 1, wherein the substrate has a thickness of 10 microns or more.

5. The decorative film of claim 4, wherein the substrate has an elongation at break of 15% or more, a maximum change in tensile strength per 1% elongation within a range of 0.2 to 10.0 MPa when stretched by 10%, a stress ratio of a stress after 20 seconds to an initial stress of 0.55 or less with respect to stress relaxation after 5% stretching, and a stress ratio of a stress after 120 seconds to an initial stress of 0.45 or less with respect to stress relaxation after 5% stretching.

6. The decorative film according to claim 1, wherein the substrate does not contain an appreciable amount of chlorine.

7. The decorative film according to claim 1, wherein the substrate does not contain any chlorine.

8. The decorative film according to claim 1, wherein the substrate does not contain an appreciable amount of polyvinyl chloride.

9. The decorative film according to claim 1, wherein the substrate does not contain any polyvinyl chloride.

10. The decorative film according to claim 1, wherein said copolymer has a molar ratio of carboxylate groups to carboxyl groups in the range of about 0.07 to about 0.28.

11. The decorative film according to claim 1, wherein said molar ratio results in a substrate having a balance of film properties superior to a similar substrate having a molar ratio greater than 0.33, said balance of film properties comprising (i) a stress ratio of a stress after 20 seconds to an initial stress of 0.55 or less with respect to stress relaxation after 5% stretching, and a stress ratio of a stress after 120 seconds to an initial stress of 0.45 or less with respect to stress relaxation after 5% stretching, (ii) a degree of ink adhesion so as to pass an Ink Adhesion Test relating to transfer of cross-cut from a sample film to a removed adhesive tape, and (iii) a degree of water resistance so as to pass a Water Resistance Test 1 and a Water Resistance Test 2.

12. The decorative film according to claim 1, wherein said copolymer is partially neutralized with a combination of ammonium hydroxide and an alkali metal hydroxide.

13. The decorative film according to claim 1, further comprising a primer layer between the substrate and the adhesive layer.

14. A decorative film comprising:
  a) a substrate comprising an ethylene-(meth)acrylic acid copolymer comprising 8 to 30 weight percent methacrylic acid that is partially neutralized so as to result in a molar ratio of carboxylate groups to carboxyl groups in the range of about 0.01 to about 0.33;
  b) an adhesive layer on a first surface of the substrate; and
  c) a top clear coat on a second surface of the substrate, wherein the second surface is opposite the first surface.

15. The decorative film according to claim 14, wherein said copolymer is partially neutralized with ammonium hydroxide, an alkali metal hydroxide, or a combination of ammonium hydroxide and an alkali metal hydroxide.

16. The decorative film according to claim 14, wherein the substrate does not contain any chlorine or polyvinyl chloride.

17. A decorative film comprising:
  a) a substrate comprising an ethylene-(meth)acrylic acid copolymer comprising 8 to 30 weight percent methacrylic acid that is partially neutralized, said substrate having a stress ratio of a stress after 20 seconds to an initial stress of 0.55 or less with respect to stress relaxation after 5% stretching, and a stress ratio of a stress after 120 seconds to an initial stress of 0.45 or less with respect to stress relaxation after 5% stretching;
  b) an adhesive layer on a first surface of the substrate; and
  c) a top clear coat on a second surface of the substrate, wherein the second surface is opposite the first surface.

18. The decorative film according to claim 17, wherein said copolymer has a molar ratio of carboxylate groups to carboxyl groups in the range of about 0.01 to about 0.33.

19. The decorative film according to claim 18, wherein said molar ratio results in a substrate having a balance of film properties superior to a similar substrate having a molar ratio greater than 0.33, said balance of film properties comprising (i) a degree of ink adhesion so as to pass an Ink Adhesion Test relating to transfer of cross-cut from a sample film to a removed adhesive tape, and (ii) a degree of water resistance so as to pass a Water Resistance Test 1 and a Water Resistance Test 2.

20. The decorative film according to claim 17, wherein the decorative film is attached to a vehicle.

* * * * *

UNITED STATES PATENT AND TRADEMARK OFFICE
CERTIFICATE OF CORRECTION

| | | |
|---|---|---|
| PATENT NO. | : 7,141,294 B2 | Page 1 of 1 |
| APPLICATION NO. | : 10/472880 | |
| DATED | : November 28, 2006 | |
| INVENTOR(S) | : Aizo Sakurai | |

It is certified that error appears in the above-identified patent and that said Letters Patent is hereby corrected as shown below:

Column 2 – Line 11 - Delete "INVENTION" and insert -- DRAWINGS --, therefor.

Column 3 – Line 1 - Delete "min.," and insert -- min. --, therefor.

Column 3 – Line 5 - Delete "min.," and insert -- min. --, therefor.

Column 5 – Line 42 - Delete "N205OH" and insert -- N2050H --, therefor.

Column 5 – Line 44 (Approx.) - Delete "(F)" and insert -- (MFR) --, therefor.

Column 7 – Line 67 - Delete "mixed." and insert -- mixed --, therefor.

Column 8 – Line 53 - Delete "this." and insert -- this --, therefor.

Signed and Sealed this

Thirtieth Day of September, 2008

JON W. DUDAS
*Director of the United States Patent and Trademark Office*